No. 813,454. PATENTED FEB. 27, 1906.
I. SCHAAD.
COUPLING JOINT FOR PIPE SECTIONS.
APPLICATION FILED JAN. 14, 1905.

WITNESSES:
G. Dietrich.
Edwin H. Dietrich.

INVENTOR
Irené Schaad,
BY
Chas. E. Gill
ATTORNEY

UNITED STATES PATENT OFFICE.

IRENÉ SCHAAD, OF LUCERNE, SWITZERLAND.

COUPLING-JOINT FOR PIPE-SECTIONS.

No. 813,454.  Specification of Letters Patent.  Patented Feb. 27, 1906.

Application filed January 14, 1905. Serial No. 241,018.

*To all whom it may concern:*

Be it known that I, IRENÉ SCHAAD, a citizen of Switzerland, residing at Lucerne, Switzerland, have invented certain new and useful Improvements in Coupling-Joints for Pipe-Sections, of which the following is a specification.

The invention relates to improvements in coupling-joints for pipe-sections; and it consists in the novel features and combinations of parts hereinafter described, and particularly pointed out in the claims.

The invention consists in a novel construction of flanges secured to the adjoining ends of the pipe-sections and forming between their inner adjacent portions an annular recess, which is cone-shaped in cross-section and holds a correspondingly-shaped packing-ring, of rubber or other suitable material, and a metal ring or hoop set within inner annular recesses formed in said flanges, said ring or hoop engaging the inner periphery of the packing-ring and retaining the latter in place, but not entirely filling said recesses. The said metal ring or hoop will preferably be formed of segments hinged together, the two end segments of the series being preferably secured together by a plate and screws or bolts.

The object of the invention is to produce a liquid-tight joint between the connected ends of pipe-sections and one which shall be capable of resisting the effects of high liquid-pressures.

My invention is not limited to use in connection with any special pipe-lines, but is particularly applicable for use in hydraulic pipe-lines through which the water is forced under pressure.

In accordance with my invention the inner metal ring or hoop does not completely fill the recesses which receive it, and hence the water-pressure may exert lateral pressure against the base of the packing-ring and operate to force said ring tightly against the outwardly-converging faces of the packing-recess, whereby said packing is caused to form a liquid-tight joint.

The invention will be fully understood from the detailed description hereinafter presented, reference being had to the accompanying drawings, in which—

Figure 1:
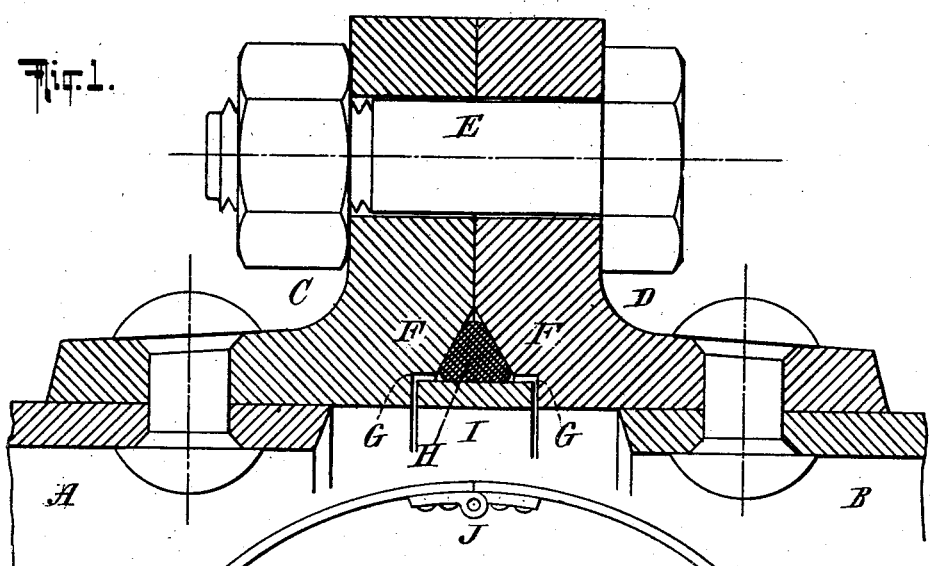
Figure 2:
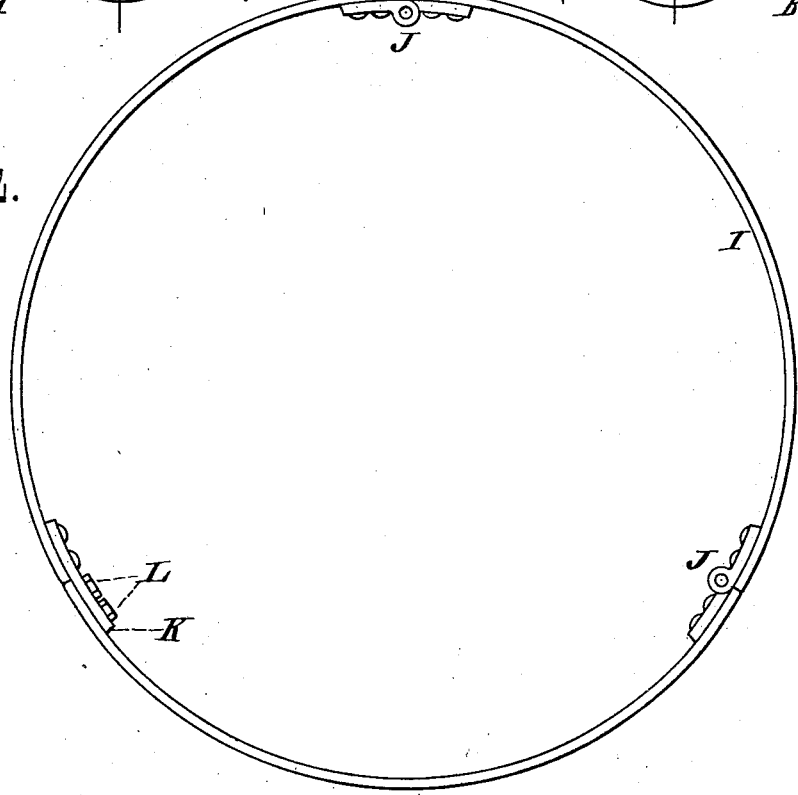

Figure 1 is a longitudinal section through a portion of the adjacent ends of two pipe-sections connected together by a coupling constructed in accordance with and embodying my invention; and Fig. 2 is a detached side elevation of the inner metal ring, shown as comprising three hinged segments.

In the drawings, A B respectively designate the adjacent portions of two pipe-sections, to which are secured the annular metal flanges C D, which extend entirely around the pipe-sections and are of general triangular form in cross-section. The flanges C D are connected together by bolts E, as usual. The important features of the flanges C D are the recesses F G, formed at their adjoining inner edges, the recesses F having outwardly-converging walls and when brought together forming an annular recess which is cone-shaped in cross-section and adapted to receive a correspondingly shaped or compressed packing-ring H, which completely fills the recess and extends slightly out of the broad base thereof, the said packing-ring being slightly deeper than said cone-shaped recess. The recesses G correspond with each other and are formed horizontally in the inner adjacent edges of the flanges C D at the base of the recesses F, and when said flanges are brought together said recesses G form an annular recess or groove adapted to receive the inner metal ring or loop I, having plain surfaces and at its outer periphery engaging the broad base of the packing-ring H, said ring I being broader than said ring H, but not as broad as the width of the recesses G. The metal ring or hoop I does not at its outer periphery engage the inner horizontal surfaces of the recesses G, and hence the liquid flowing under pressure through the pipe-line may pass within said recesses G and exert lateral pressure against the opposite sides of the base of the packing-ring H, whereby said ring H will be pressed the more securely against the converging walls of the recesses F and leakage at the joint be prevented.

The metal ring I maintains the packing-ring H in place under all conditions, and this ring may be in one integral piece, but is preferably composed of a series of segments connected together by hinges J, the meeting ends of the two end segments being detachably secured together by a plate K and screws L. When the ring I is formed of the segments or in sections, it may be removed and replaced at any time when the pipe-sections are large enough to admit a workman without removing the bolts E, and at any time it will be found to be more convenient in applying and securing the packing to form the ring I in sections.

What I claim as my invention, and desire to secure by Letters Patent, is—

1. The coupling for the adjacent ends of pipe-sections comprising the flanges secured to said ends and having in their inner adjoining edges the recesses F, G, combined with the packing H in the recesses F, and the metal ring I in the recesses G and engaging the inner surface of said packing, said ring not completely filling said recesses G, and said packing projecting from the recesses F into said recesses G; substantially as set forth.

2. The coupling for the adjacent ends of pipe-sections comprising the flanges secured to said ends and having in their inner adjoining edges the recesses F, G, combined with the packing H in the recesses F, and the metal ring I in the recesses G and engaging the inner surface of said packing, said recesses F when brought together forming an annular recess which is cone-shaped in cross-section; substantially as set forth.

3. The coupling for the adjacent ends of pipe-sections comprising the flanges secured to said ends and having in their inner adjoining edges the recesses F, G, combined with the packing H in the recesses F, and the metal ring I in the recesses G and engaging the inner surface of said packing, said ring I being formed of segments connected together; substantially as set forth.

4. The coupling for the adjacent ends of pipe-sections comprising the flanges secured to said ends and having in their inner adjoining edges the recesses F, G, combined with the packing H in the recesses F, and the metal ring I in the recesses G and engaging the inner surface of said packing, said ring I being composed of segments hinged together and the adjoining ends of the end segments being secured together by a plate and screws; substantially as set forth.

Signed at Lucerne, Switzerland, this 28th day of December, 1904.

IRENÉ SCHAAD.

Witnesses:
HENRY H. MORGAN,
VITAL FAUER.